(12) United States Patent
Laber et al.

(10) Patent No.: US 10,177,628 B2
(45) Date of Patent: Jan. 8, 2019

(54) ELECTRICAL POWER TOOL

(71) Applicant: Robert Bosch GmbH, Stuttgart (DE)

(72) Inventors: Sebastian Laber, Leinfelden-Echterdingen (DE); Patrick Budaker, Heubach (DE)

(73) Assignee: ROBERT BOSCH GMBH, Stuttgart (DE)

(*) Notice: Subject to any disclaimer, the term of this patent is extended or adjusted under 35 U.S.C. 154(b) by 861 days.

(21) Appl. No.: 13/903,639

(22) Filed: May 28, 2013

(65) Prior Publication Data
US 2013/0313927 A1    Nov. 28, 2013

(30) Foreign Application Priority Data

May 25, 2012 (DE) .................. 10 2012 208 887
May 8, 2013 (DE) .................. 10 2013 208 433

(51) Int. Cl.
*H02K 7/14* (2006.01)
*B25F 5/00* (2006.01)
(Continued)

(52) U.S. Cl.
CPC .............. *H02K 7/145* (2013.01); *B25F 5/00* (2013.01); *H02K 3/522* (2013.01); *H02K 11/0094* (2013.01); *H02K 2203/06* (2013.01)

(58) Field of Classification Search
CPC .. H02K 3/52; H02K 3/32; H02K 3/34; H02K 3/50; H02K 3/505; H02K 3/521;
(Continued)

(56) References Cited

U.S. PATENT DOCUMENTS 5,861,689 A * 1/1999 Snider .................... H02K 3/522
                                                310/71
6,570,280 B2 * 5/2003 Takahashi .............. H01R 12/58
                                                310/71
(Continued)

FOREIGN PATENT DOCUMENTS

CN        1720653 A    1/2006
CN     102163885 A    8/2011
(Continued)

OTHER PUBLICATIONS

Takeuchi (JP 2008131820 A) English Translation.*

*Primary Examiner* — Quyen P Leung
*Assistant Examiner* — Robert E Mates
(74) *Attorney, Agent, or Firm* — Norton Rose Fulbright US LLP; Gerard Messina

(57) ABSTRACT

An electrical power tool has an electronically commutated drive motor, preferably a direct current motor. The motor includes a stator core equipped with an insulating body, on which core a motor winding is embodied. Also included in the motor is at least one electrically conductive connector element for electrical connection of the motor winding, the connector element being disposed on the insulating body. The connector element has a fastening segment, and a receptacle for reception of the fastening segment is provided on the insulating body. The fastening segment and the receptacle have complementary geometrical shapes that prevent self-actuated detachment of the fastening segment disposed in the receptacle.

15 Claims, 6 Drawing Sheets

(51) Int. Cl.
*H02K 11/00* (2016.01)
*H02K 3/52* (2006.01)

(58) Field of Classification Search
CPC ........ H02K 3/522; H02K 3/524; H02K 3/525; H02K 3/527; H02K 3/528
USPC ................. 310/194, 260, 71, 214, 270, 68 R
See application file for complete search history.

(56) References Cited

U.S. PATENT DOCUMENTS

| | | | | |
|---|---|---|---|---|
| 7,262,529 | B2* | 8/2007 | Klappenbach | H02K 3/522 310/71 |
| 7,626,303 | B2* | 12/2009 | Watanabe | H02K 3/522 310/194 |
| 7,872,383 | B2* | 1/2011 | Dubuc | H02K 11/048 310/68 R |
| 8,035,263 | B2* | 10/2011 | Kienzler | H02K 3/522 310/179 |
| 2002/0047504 | A1 | 4/2002 | Takahashi | |
| 2004/0183388 | A1* | 9/2004 | Rittmeyer | H02K 3/28 310/179 |
| 2007/0106315 | A1* | 5/2007 | Gregoric | A61B 17/11 606/158 |
| 2007/0296292 | A1 | 12/2007 | Kienzler et al. | |
| 2009/0102314 | A1* | 4/2009 | Miyata | H02K 1/243 310/257 |
| 2009/0167122 | A1* | 7/2009 | Schurig | H02K 11/046 310/68 D |
| 2011/0241457 | A1* | 10/2011 | Muller | A01D 34/902 310/50 |

FOREIGN PATENT DOCUMENTS

| | | |
|---|---|---|
| CN | 102205535 A | 10/2011 |
| DE | 202006014850 | 11/2006 |
| JP | 2008131820 A * | 6/2008 |

* cited by examiner

ELECTRICAL POWER TOOL

FIELD OF THE INVENTION

The present invention relates to an electrical power tool having an electrically commutated drive motor, preferably a direct current motor, that has a stator core equipped with an insulating body, on which core a motor winding is embodied, at least one electrically conductive connector element for electrical connection of the motor winding being disposed on the insulating body.

BACKGROUND INFORMATION

The existing art discloses a handheld power tool of this kind having a drive motor, in which connector elements for electrical connection of its motor winding, which is disposed on an insulating body of an associated stator core, are provided on the insulating body. The connector elements can be, for example, retained in stationary fashion on the insulating body for example by way of housing elements of the drive motor, or injection-embedded into the insulating body.

A disadvantage of the existing art is that upon winding, the connector elements retained in stationary fashion on the insulating body by way of housing elements of the drive motor must be held on the insulating body by way of a separate device, with the result that winding becomes laborious and complicated. Because the connector elements injection-embedded into the insulating body must likewise be aligned and held on the insulating body by way of a separate device upon plastic injection molding of the insulating body, injection embedding is likewise laborious and difficult.

SUMMARY

An object of the present invention is therefore to make available a novel electrical power tool in which associated connector elements for electrical connection of the motor winding of an associated electronically commutated drive motor are retained in simple fashion on an associated insulating body.

This problem is solved by an electrical power tool having an electronically commutated drive motor, preferably a direct current motor, that has a stator core equipped with an insulating body, on which core a motor winding is embodied. At least one electrically conductive connector element for electrical connection of the motor winding is disposed on the insulating body. The connector element has a fastening segment, and a receptacle for reception of the fastening segment is provided on the insulating body. The fastening segment and the receptacle have complementary geometrical shapes that are embodied to prevent self-actuated detachment of the fastening segment disposed in the receptacle.

The present invention thus makes it possible to furnish an electrical power tool having a drive motor, in the context of the installation of which motor electrically conductive connector elements for electrical connection of a corresponding motor winding can be retained in quick and uncomplicated fashion on an associated insulating body.

The fastening segment and the receptacle are preferably provided in order to form a positively engaged join between the connector element and insulating body.

The electrically conductive connector elements can thus easily be retained in secure and reliable fashion on the insulating body.

The fastening segment and the receptacle preferably have dimensions that are provided to embody a frictionally engaged joining between the connector element and insulating body.

Retention of the connector elements on the insulating body can thereby be additionally secured.

According to an embodiment of the present invention, the connector element has a connector segment, joined to the fastening segment, that engages through an opening that is provided in the insulating body and extends into the receptacle.

The present invention thereby makes it possible to furnish a robust connector element having a compact configuration.

At least one hook-shaped connector member for achieving an electrically conductive connection to at least one lead associated with the motor winding is preferably embodied on the connector segment.

The lead associated with the motor winding can thus be connected, quickly and without complication, in electrically conductive fashion to the connector element.

The connector segment is preferably embodied at least locally in the manner of a flat connector for at least indirect electrically conductive connection to an associated voltage source.

The connector element can thus be easily connected in electrically conductive fashion to the associated voltage source.

The connector segment and the fastening segment are preferably disposed at an angle of approximately 90° with respect to one another.

A connector element having a stable configuration can thereby be made available.

According to an embodiment of the present invention, the insulating body has at least one first and one second insulating body segment that are slid from mutually axially oppositely located end regions of the stator core onto the latter, the connector element being disposed on the first insulating body segment.

The present invention thus makes it possible to furnish an insulating body usable for at least axial insulation of the stator core.

The first insulating body segment preferably has an annular bracing member for bracing against the stator core, in which the receptacle is embodied at least in segments, the fastening segment being disposed between the annular bracing member and the stator core.

Additional bracing and securing of the connector elements on the insulating body can thereby be enabled in simple fashion.

According to an embodiment, an insulating element is disposed between the fastening segment and the stator core.

The present invention thereby makes possible secure and reliable insulation of the connector element from the stator core.

Preferably the insulating body is retained by the motor winding on the stator core, and the connector element is retained by the stator core on the insulating body.

The connector element can thus be additionally retained and secured on the insulating body by the motor winding wound onto the insulating body.

In addition, the problem recited previously is also solved by an electronically commutated drive motor, preferably a direct current motor, that has a stator core equipped with an insulating body, on which core a motor winding is embodied. At least one electrically conductive connector element for electrical connection of the motor winding is disposed on the insulating body. The connector element has a fastening segment, and a receptacle for reception of the fastening segment is provided on the insulating body. The fastening segment and the receptacle have complementary geometrical shapes that are embodied to prevent self-actuated detachment of the fastening segment disposed in the receptacle.

DETAILED DESCRIPTION

Figure 1:
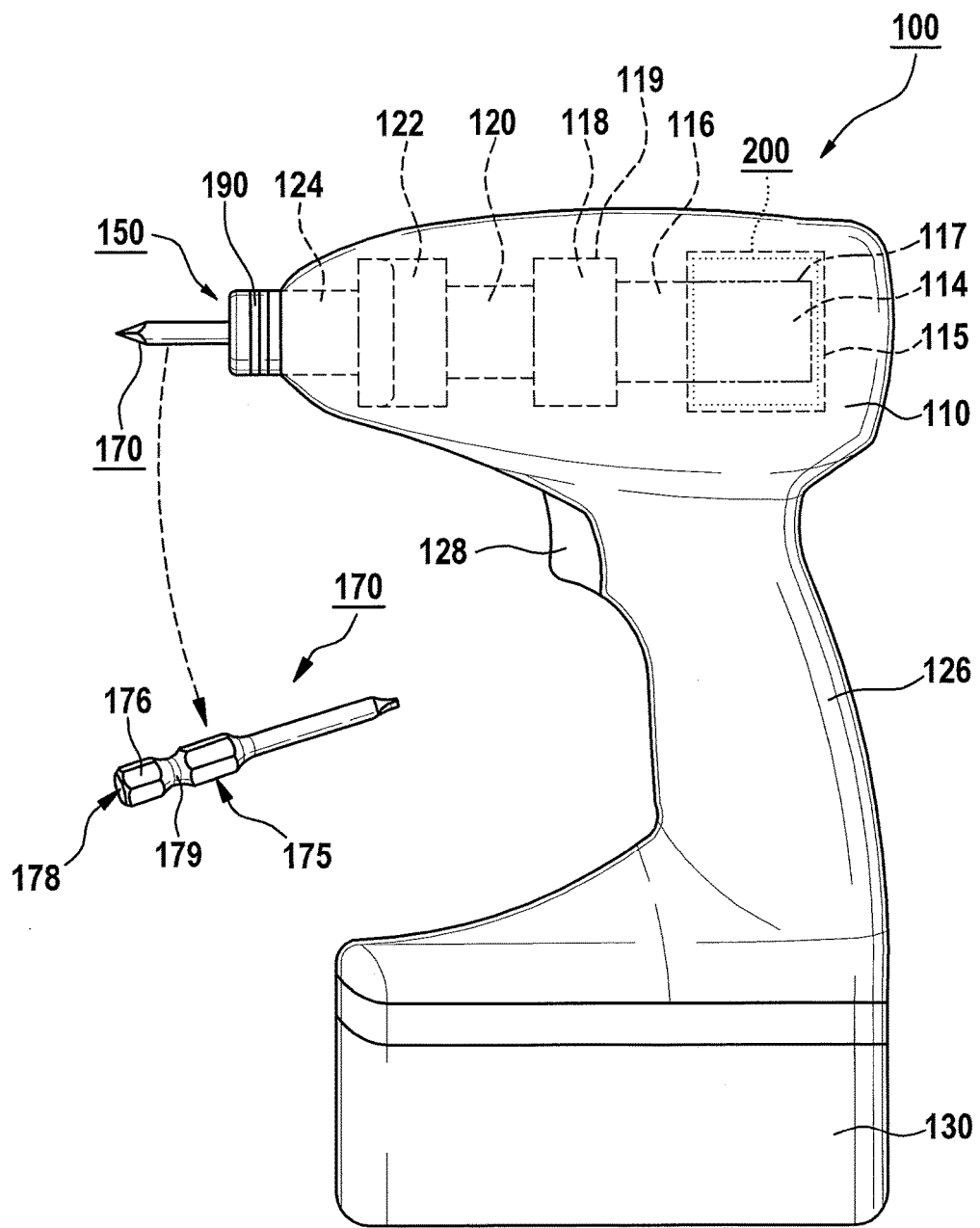
FIG. 1 shows a schematic view of an electrical power tool having an electronically commutated drive motor, according to an embodiment.

FIG. 1 shows an electrical power tool 100 that is equipped with a tool receptacle 150 and has a housing 110 having a handle 126. According to an embodiment of the present invention, electrical power tool 100 is mechanically and electrically connectable to a rechargeable battery pack 130 for cordless power supply.

Electrical power tool 100 is embodied by way of example as a rechargeable battery-operated impact driver. Note, however, that the present invention is not limited to rechargeable battery-operated impact drivers, but instead can be applied to different electrical power tools, for example a driver, a drill driver, an impact drill driver, a saw, a grinder, a milling machine, etc., regardless of whether electrical power tool 100 is drivable in cordless fashion with rechargeable battery pack 130 or in line-connected fashion.

An electric drive motor 114 supplied with power from rechargeable battery pack 130, a gearbox 118, and an optional impact mechanism 122 are disposed in housing 110. Drive motor 114 can be actuated, for example, via a manual switch 128, i.e. switched on and off, and preferably electronically controlled or regulated in such a way that both a reverse mode and also stipulations with regard to a desired rotation speed can be implemented.

According to an exemplary embodiment, drive motor 114 is an electronically commutated drive motor, preferably a direct current motor, that illustratively has stator and rotor components 200 and 117, respectively. Stator components 200 may correspond, by way of example, an external stator, and are further described below with reference to FIGS. 2 and 3, while further description of rotor components 117 comprising an internal rotor have been omitted in the interest of a concise and simple description. Be it noted, however, that the description of a drive motor having an external stator and internal rotor is merely exemplifying in nature and is not to be understood as a limitation of the present invention, which can also be utilized with a drive motor having an internal stator and external rotor. A description of the functionality of the electronically commutated drive motor 114 has moreover also been omitted in the interest of a concise and simple description, since that functionality is sufficiently known to one skilled in the art.

Drive motor 114 is joined via an associated motor shaft 116 to gearbox 118, which converts a rotation of motor 116 into a rotation of a drive member 120, e.g. a drive shaft, provided between gearbox 118 and impact mechanism 122. This conversion preferably occurs in such a way that drive member 120 rotates relative to motor shaft 116 with increased torque but at a decreased rotation speed. Drive motor 114 is disposed illustratively in a motor housing 115, and gearbox 118 is disposed in a gearbox housing 119; gearbox housing 119 and motor housing 115 are disposed, by way of example, in a housing 110.

The optional impact mechanism 122 joined to drive member 120 is, by way of example, a rotary or rotational impact mechanism that generates high-intensity rotary impact pulses and transfers them to an output shaft 124, for example, an output spindle. An exemplifying impact mechanism with which impact mechanism 122 can be implemented is described in German Utility Model No. 20 2006 014 850 U1, hereby incorporated by reference, so that in the interest of a concise description, a detailed description of impact mechanism 122 can be omitted here.

Embodied on output shaft 124 is tool receptacle 150, which is provided illustratively for the reception of inserted tools having external polygonal couplings and has, for example, a locking sleeve 190 for locking the inserted tools in an internal receptacle of tool receptacle 150. Tool receptacle 150 is embodied by way of example to receive an inserted tool 170, embodied in the manner of a screwdriver bit, that has a shaft 176 having a coupling contour 175, embodied in an axial end region 178, that is formed by a polygonal, in particular hexagonal cross section of shaft 176 and by an external annular groove 179, e.g. in accordance with DIN 3126-E6.3, provided thereon. A screwdriver bit of this kind, which is illustratively of the so-called "hex" type, is sufficiently known from the existing art that a detailed description will be omitted here in the interest of a concise description. Be it noted, however, that the present invention is not limited to a use of hex screwdriver bits, but rather that further inserted tools can also be utilized depending on a respectively selected configuration of tool receptacle 150, e.g. hex drill bits or so-called SDS-Quick inserted tools.

Figure 2:
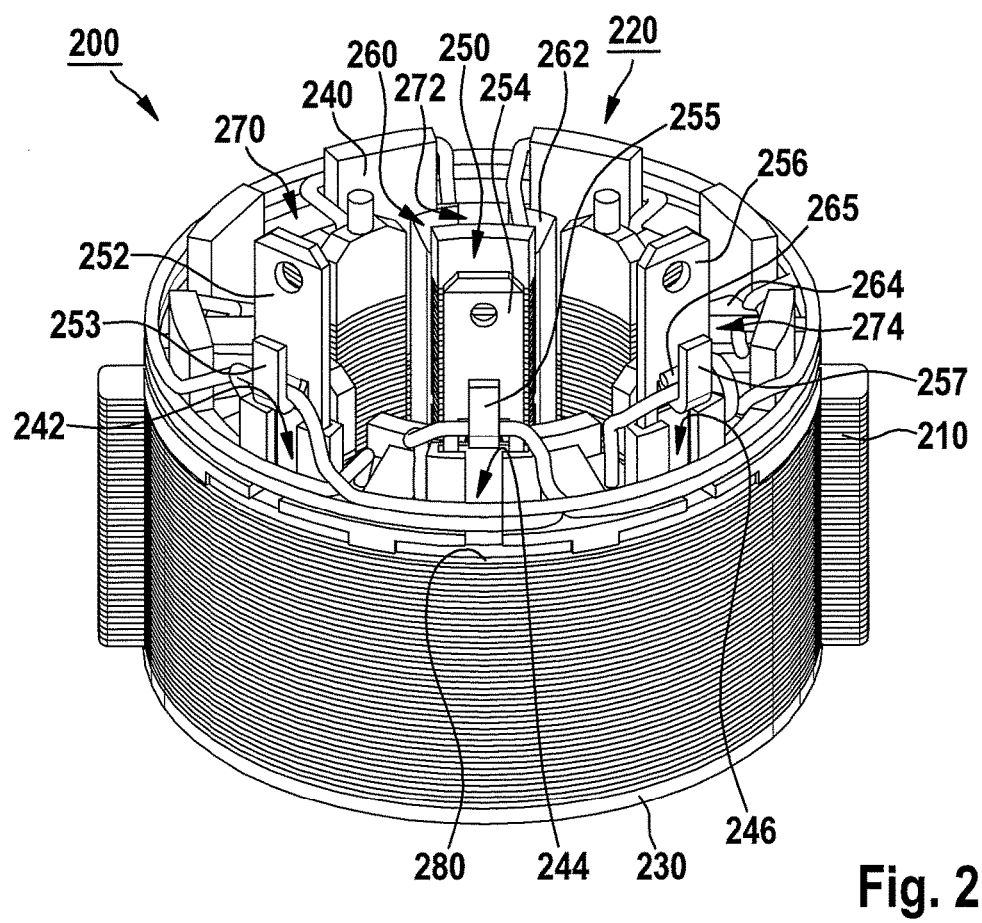
FIG. 2 shows a perspective view of stator components associated with the electronically commutated drive motor of FIG. 1, having an insulating body equipped with connector elements, according to an embodiment.

FIG. 2 shows stator components 200 of the electronically commutated drive motor 114 of electrical power tool 100 of FIG. 1, which illustratively have a stator core 210 equipped with an insulating body 220, on which core a motor winding 260 is embodied. The latter is wound, for example using any suitable winding method, onto stator core 210 equipped with insulating body 220, and can have a plurality of interconnected individual coils. By way of example, in the interest of graphic simplicity and clarity only two individual coils are labeled with reference characters 262, 264.

Stator core 210 illustratively has a plurality of lamination plates layered one above another, and with insulating body 220 makes up a plurality of stator poles, e.g. nine stator poles, only three of which in the interest of graphic simplicity and clarity, are labeled with reference characters 270, 272, 274. Insulating body 220 has, by way of example, at least one first and one second insulating body segment 240, 230 that, proceeding from mutually axially oppositely located end regions of stator 210, are slid onto the latter (in FIG. 2, from above and below). In order to simplify the description, first insulating body segment 240 will therefore also be referred to hereinafter as the "upper insulating body segment," and second insulating body segment 230 as the "lower insulating body segment."

According to an exemplary embodiment, at least one electrically conductive connector element for electrical connection of motor winding 250 is disposed on insulating body 220. By way of example, three electrically conductive connector elements 252, 254, 256 are disposed on insulating body 220. These are insulated with respect to stator core 210 by an insulating element 280 that is annular by way of example, and pass through respective associated openings 242, 244, 246 provided on upper insulating body segment 240, so that connector elements 252, 254, 256 are disposed and retained on upper insulating body segment 240 of insulating body 220.

According to an exemplary embodiment, insulating body 220 is held on stator core 210 by motor winding 260, and connector elements 252, 254, 256 are retained by stator core 210 on insulating body 220, or respectively on upper insulating body segment 240, in such a way that connector elements 252, 254, 256 cannot be nondestructively removed from insulating body 220. In addition, each of connector elements 252, 254, 256 illustratively has a respective hook-shaped connector member 253, 255, 257 for electrically conductive connection to at least one lead associated with motor winding 260. For example, a lead 265 associated with motor winding 260 is connected to hook-shaped connector member 257 of connector element 256.

Figure 3:
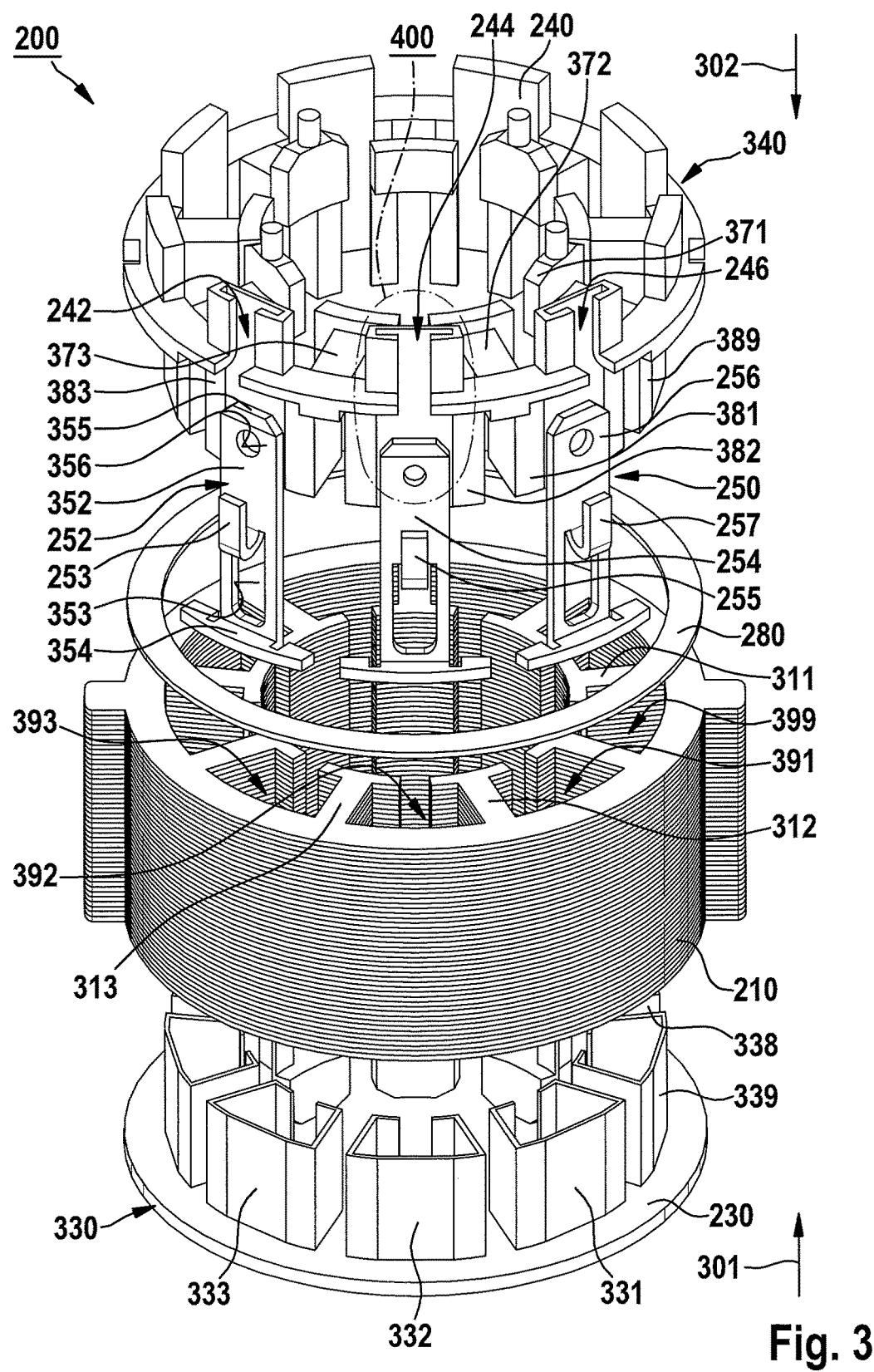
FIG. 3 shows an exploded view of the stator components of FIG. 2.

FIG. 3 shows stator components 200 of FIG. 2, without motor winding 260 of FIG. 2, in the context of exemplifying installation of connector elements 252, 254, 256 on upper insulating body segment 240 of insulating body 220, and of upper insulating body segment 240 equipped with connector elements 252, 254, 256, of annular insulating element 280, and of lower insulating body segment 230, on stator core 210. The latter has, by way of example, a plurality of (illustratively T-shaped) stator teeth, of which, in the interest of graphic simplicity and clarity, only three are labeled with reference characters 311, 312, 313, between each of which are embodied winding slots for the reception of motor winding 260 of FIG. 2, or individual coils 262, 264 thereof in FIG. 2, of which, in the interest of graphic simplicity and clarity, only four are characterized with reference characters 391, 392, 393, 399.

By way of example, a plurality of column-like slot insulators are embodied on lower insulating body segment 230, for example on an insulator plate 330, in order to insulate winding slots 391, 392, 393, 399. Five of these slot insulators are characterized by way of example with reference characters 331, 332, 333, 338, 339, slot insulators 331, 332, 333, 339 being provided for insulation, at least in portions, of the respective winding slots 391, 392, 393, 399.

Embodied on upper insulating body segment 240 on an annular bracing member 340 are, for example, a plurality of column-like slot insulators, of which four, by way of example, are characterized with reference characters 381, 382, 383, 389, these likewise being provided for insulation, at least in portions, of the respective winding slots 391, 392, 393, 399. The column-like slot insulators 389, 381, 382, 383 are connected to one another via tab-like joining members 371, 372, 373. By way of example, opening 246 for reception of connector element 256 is provided in the region of slot insulator 381, opening 244 for reception of connector element 254 is provided in the region of slot insulator 382, and opening 242 for reception of connector element 252 is provided in the region of slot insulator 383. Annular bracing member 340 serves for bracing against stator core 210. A detail 400 of upper insulating body segment 240 is described below with reference to FIG. 4.

According to an exemplary embodiment, connector element 252 has a fastening segment 354 as well as a connector segment 352, joined thereto, on which hook-shaped connector member 253 is embodied. The latter can be produced, for example, by being cut out of connector segment 352 and then reshaped so that an opening 353 is formed in connector segment 352. In addition, a further opening 356 can be provided in connector segment 352, for example for connecting an external lead, for example for at least indirect electrically conductive connection to an associated voltage source, e.g. to rechargeable battery pack 130 of FIG. 1.

Connector segment 352 is furthermore embodied at least locally in the manner of a flat connector for at least indirect electrically conductive connection to the associated voltage source, and is disposed illustratively at an angle of approximately 90° to fastening segment 354.

In the context of the installation, by way of example, of stator components 200, firstly connector elements 252, 254, 256 are slid, in the direction of an arrow 301 as shown, into respective openings 242, 244, 246 provided therefor on upper insulating body segment 240, and retained there as described below with reference to FIG. 5. Annular insulating element 280 is then positioned at an axial end, facing toward upper insulating body segment 240, of stator core 210, and upper insulating body segment 240 is installed, with connector elements 252, 254, 256, in the direction of an arrow 302 as shown, on stator core 210. Subsequently or previously, lower insulating body segment 230 is installed on stator core 210 in the direction of arrow 301 as shown. Motor winding 260 of FIG. 2 can then be wound onto stator components 200 installed in this manner.

Figure 4:
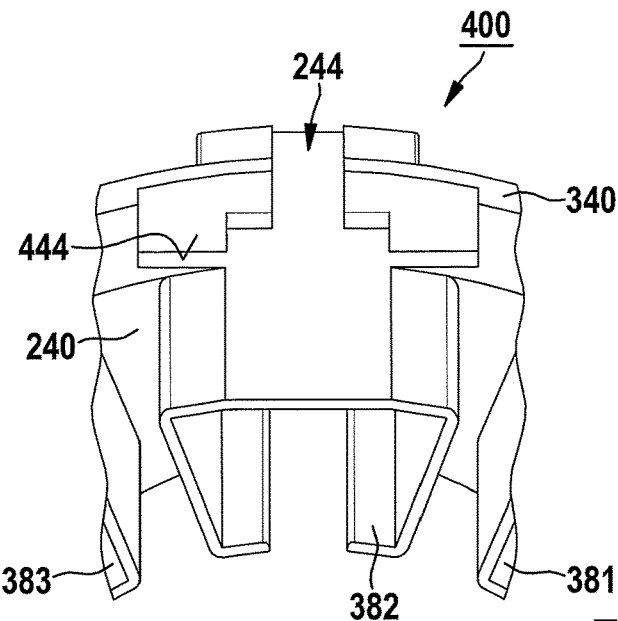
FIG. 4 shows a perspective view of a detail of the insulating body of FIG. 3.

FIG. 4 shows a detail 400 of upper insulating body 240 of insulating body 220 of FIGS. 2 and 3, which has slot insulators 381, 382, 383 disposed on annular bracing member 340, and opening 344 disposed in the region of slot insulator 382. The opening extends, illustratively, through annular bracing member 340 into a receptacle 444 that will be described further with reference to FIG. 5 below.

Figure 5:
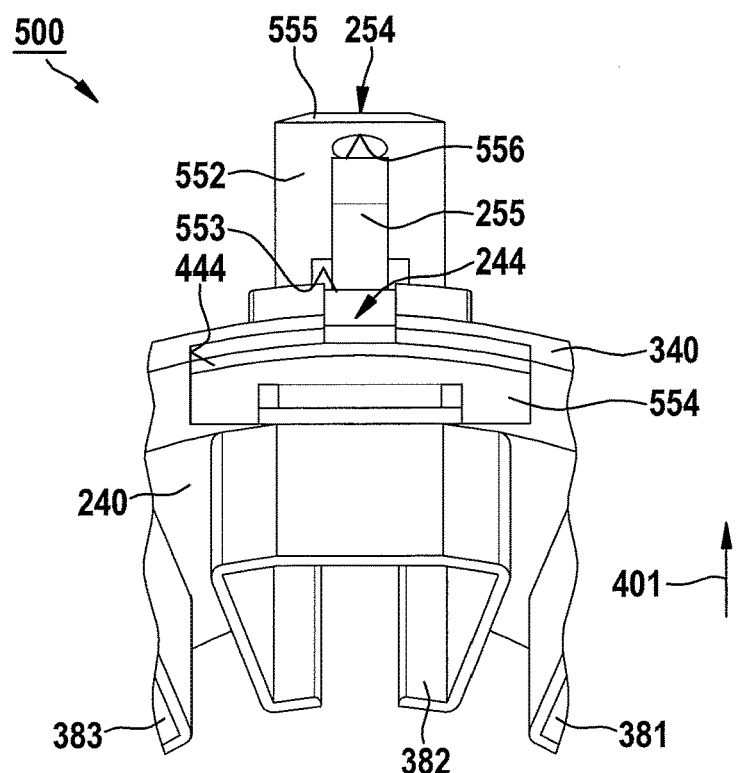
FIG. 5 shows a perspective view of the detail of the insulating body of FIG. 4 with one of the connector elements of FIG. 3 disposed thereon.

FIG. 5 shows slot insulator 382 embodied on annular bracing member 340 of upper insulating body segment 240; provided in the region of the insulator is opening 244, which extends into receptacle 444 and in which connector element 254 of FIG. 3 is, illustratively, retained. The element has, analogously to connector element 252 of FIG. 3, a fastening segment 554 as well as a connector segment 552, joined thereto and embodied at least locally in the manner of a flat connector, which is disposed e.g. at an angle of approximately 90° with respect to fastening segment 554, and on which are embodied on the one hand hook-shaped connector member 255 in the region of an opening 553, and on the other hand, by way of example, a further opening 556.

Illustratively, receptacle 444 is embodied at least in portions in or on annular bracing member 340 and is provided in order to receive fastening segment 554. According to an exemplary embodiment, fastening segment 554 and receptacle 444 have complementary geometrical shapes which are embodied to prevent self-actuated detachment of fastening segment 554 disposed in receptacle 444, in particular self-actuated sliding of fastening segment 554 out of receptacle 444. For example, fastening segment 554 and receptacle 444 are provided so as to comprise a positively engaged join between connector element 254 and insulating body 220 of FIGS. 2 and 3, or upper insulating body segment 240. In addition, fastening segment 554 and receptacle 444 can have dimensions that are provided so as to comprise a frictionally engaged join between connector element 254 and insulating body 220 of FIGS. 2 and 3 or upper insulating body segment 240. These dimensions can be predefined for this purpose in such a way that fastening segment 554 can be clamp-locked in receptacle 444 or pressed into it.

According to an exemplary embodiment, for retention on upper insulating body segment 240, connector element 254 is slid in the direction of an arrow 401 as shown via receptacle 444 into opening 244. As a result, connector element 254 is disposed on upper insulating body segment 240 in such a way that its connector segment 552 passes through opening 244 and its fastening segment 554 is received in receptacle 444 in positively and/or frictionally engaged fashion such that after the installation of stator components 200 described with reference to FIG. 3, fastening segment 554 is disposed between annular bracing member 340 and stator core 210 of FIG. 3, and insulating element 280 is disposed between fastening segment 554 and stator core 210.

Figure 6:
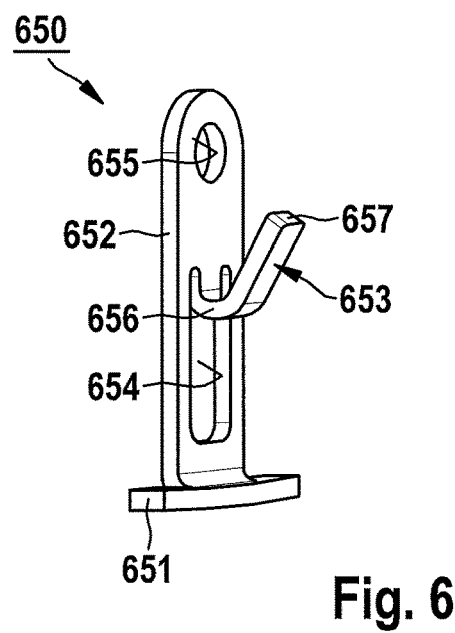
FIG. 6 shows a perspective view of a connector element according to another embodiment.

FIG. 6 shows an electrically conductive connector element 650 developed according to another embodiment, by which connector elements 252, 254, 256 of FIGS. 2 and 3 are able to be realized. Connector element 650 includes a fastening segment 651, and a connector segment 652, joined thereto, on which a hook-shaped connector member 653 is embodied. The latter has a winding segment 656 and a holding segment 657, which are described in detail below under FIG. 7.

Connector member 653 can be produced, for example, by being cut out of connector segment 652 and then reshaped so that an opening 654 is formed in connector segment 652. In addition, a further opening 655 can be provided in connector segment 652, for example for connecting an external lead, for instance for an at least indirect electrically conductive connection to an associated voltage source, e.g., to rechargeable battery pack 130 of FIG. 1. Connector segment 652 is furthermore embodied at least locally in the manner of a flat connector for at least indirect electrically conductive connection to said associated voltage source, and is preferably disposed at an angle of approximately 90° to fastening segment 654.

Figure 7:
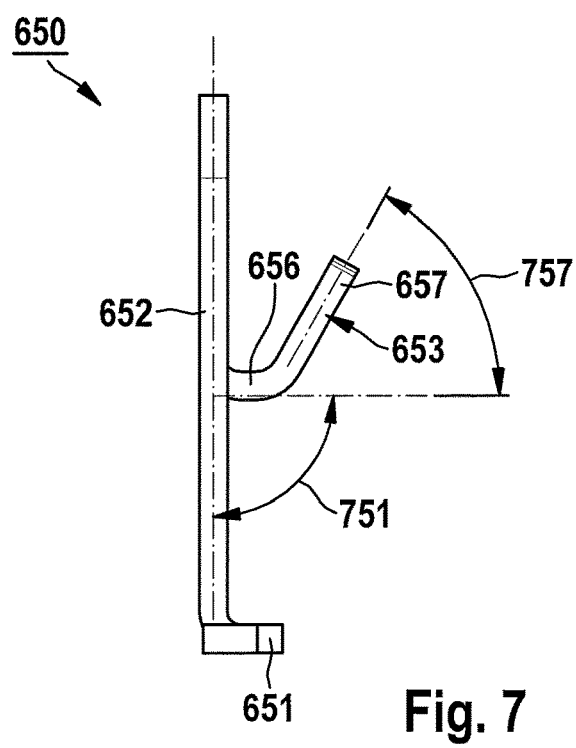
FIG. 7 shows a side view of the connector element of FIG. 6.

FIG. 7 shows electrically conductive connector element 650 of FIG. 6 with connector member 653, embodied on connector segment 652, which includes winding segment 656 and holding segment 657. Winding segment 656 preferably is embodied as a typical straight cross-piece, which is disposed at least approximately at a right angle to connector segment 652, i.e., winding segment 656 and connector segment 652 have longitudinal axes that are aligned at an angle 751 of at least approximately 90° relative to each other. Holding segment 657 preferably is also developed as a type of straight cross-piece, which connects to winding segment 656 and is bent at a predefined angle 757 in relation thereto, the angle preferably being between 30° and 60°, preferably approximately 45°. Angle 757 is illustratively sketched between respective longitudinal axes of holding segment 657 and winding segment 656.

Figure 8:
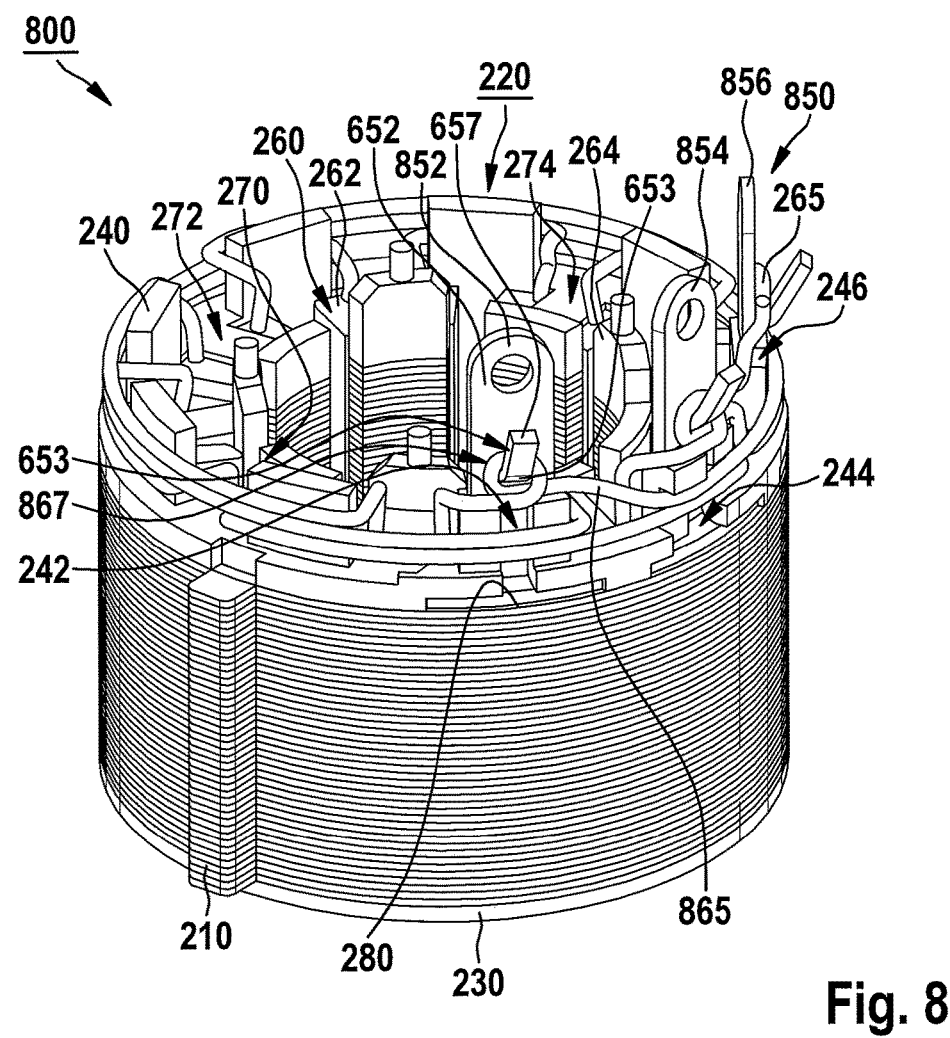
FIG. 8 shows a perspective view of the stator components with the insulation body of FIG. 2, which is provided with connector elements according to FIGS. 6 and 7.

FIG. 8 shows exemplary stator components 800, which may be used instead of stator components 200 of FIGS. 1 to 3 to realize electrically commutated drive motor 114 of electrical power tool 100 of FIG. 1. Stator components 800 correspond at least essentially to stator components 200 of FIGS. 1 to 3, but in contrast thereto, include electrically conductive connector elements 850, instead of connector elements 250 of FIGS. 2 and 3.

By way of example, electrically conductive connector elements 850 include three electrically conductive connector elements 852, 854, 856, each being realized by connector element 650 of FIGS. 6 and 7, and, as described under FIGS. 2 and 3 with reference to connector elements 252, 254, 256, are situated on insulating body 220 of FIGS. 2 and 3. Accordingly, each connector element 852, 854, 856 has fastening segment 651, connector segment 652, joined thereto, and hook-shaped connector member 653, embodied thereon and provided with winding segment 656 and holding segment 657 of FIGS. 6 and 7; in the interest of graphic simplicity and clarity, only connector segment 652, connector member 653, winding segment 656 and holding segment 657 of connector element 852 having been marked.

Electrically conductive connector elements 852, 854, 856, in the same way as connector elements 250 of FIGS. 2 and 3, are provided for the electrical connection of motor winding 260 of FIGS. 2 and 3, which, as described under FIG. 2, preferably are wound onto stator core 210 of FIGS. 2 and 3, provided with insulating body 220, using any suitable winding method, e.g., needle winding technology. In the process, preferably at least one lead assigned to motor winding 260 is connected to at least one hook-shaped connector member of connector elements 852, 854, 856. For example, a lead 865, associated with motor winding 260, is connected to hook-shaped connector member 653 of connector element 852.

According to one embodiment, assigned lead 865 is connected to hook-shaped connector member 653 in such a way that it is first guided past connector segment 652 below winding segment 656—in FIG. 8—, whereupon it is wound around connector member 653 in the way of a loop, and then is guided away, once again past connector segment 652 below winding segment 656—in FIG. 8—. This creates a lead loop, denoted by 867, at connector member 653, which at least provides secure and reliable traction relief for lead 865 during further processing of lead 865, or during subsequent winding of lead 865 onto stator core 210 of FIGS. 2 and 3, provided with insulating body 220.

When forming lead loop 867, lead 865 is secured against oversliding due to the cross-piece-like straight development of winding segment 656. In addition, the loop-type winding of connector member 653 may take place without any effect on previous positions of lead 865. Moreover, there is neither a need to bring lead 865 into a set-down position, nor to sever and restart the winding. Furthermore, at the winding conclusion, stator elements 800 may be handed over without additional measures, such as an insertion of open or parked leads into connector members etc., in a following process step for contacting lead 865. This following process step of contacting lead 865, e.g., by soldering, welding etc., may advantageously take place with reliable positional accuracy of lead 865.

What is claimed is:

1. An electrical power tool, comprising:
   an electronically commutated drive motor that includes:
   a stator core equipped with an insulating body;
   a motor winding arranged on the stator core;
   at least one electrically conductive connector element for electrically connecting the motor winding, the connector element being disposed on the insulating body and including a fastening segment; and
   a receptacle for receiving the fastening segment and provided on the insulating body, wherein the fastening segment and the receptacle have complementary geometrical shapes that are structured and sized such that a form-fit joining and/or frictionally engaged joining exists between the connector element and the insulating body and the complementary geometrical shapes are configured to prevent a self-actuated sliding of the fastening segment in the receptacle.

2. The electrical power tool as recited in claim 1, wherein the connector element includes a connector segment joined to the fastening segment and is capable of engaging through a through-opening provided in the insulating body and extending into the receptacle.

3. The electrical power tool as recited in claim 2, wherein the connector segment includes at least one hook-shaped connector member for providing an electrically conductive connection to at least one lead associated with the motor winding.

4. The electrical power tool as recited in claim 2, wherein the connector segment is embodied at least locally as a flat connector for providing at least an indirect electrically conductive connection to an associated voltage source.

5. The electrical power tool as recited in claim 2, wherein the connector segment and the fastening segment are disposed at an angle of approximately 90° with respect to one another.

6. The electrical power tool as recited in claim 1, wherein:
the insulating body includes at least one first insulating body segment and at least one second insulating body segment that are slid from mutually axially oppositely located end regions of the stator core onto the stator core, and
the connector element is disposed on the at least one first insulating body segment.

7. The electrical power tool as recited in claim 6, wherein:
the at least one first insulating body segment includes an annular bracing member for bracing against the stator core,
the receptacle is structured as at least in segments in the annular bracing member, and
the fastening segment is disposed between the annular bracing member and the stator core.

8. The electrical power tool as recited in claim 7, further comprising an insulating element disposed between the fastening segment and the stator core.

9. The electrical power tool as recited in claim 1, wherein:
the insulating body is retained by the motor winding on the stator core, and
the connector element is retained by the stator core on the insulating body.

10. The electrical power tool as recited in claim 1, wherein the electronically commutated drive motor includes a direct current motor.

11. An electronically commutated drive motor, comprising:
a stator core equipped with an insulating body;
a motor winding arranged on the stator core;
at least one electrically conductive connector element for electrically connecting the motor winding, the connector element being disposed on the insulating body and including a fastening segment; and
a receptacle for receiving the fastening segment and provided on the insulating body, wherein the fastening segment and the receptacle have complementary geometrical shapes that are structured and sized such that a form-fit joining and/or frictionally engaged joining exists between the connector element and the insulating body and the complementary geometrical shapes are configured to prevent a self-actuated sliding of the fastening segment in the receptacle.

12. The electronically commutated drive motor as recited in claim 11, wherein the electronically commutated drive motor includes a direct current motor.

13. The electrical power tool as recited in claim 1, wherein the fastening segment is clamp-locked or pressed into the receptacle.

14. The electrical power tool as recited in claim 1, wherein the complementary geometrical shapes are structured and sized such that a frictionally engaged joining exists between the connector element and the insulating body.

15. The electronically commutated drive motor as recited in claim 11, wherein the complementary geometrical shapes are structured and sized such that a frictionally engaged joining exists between the connector element and the insulating body.

* * * * *